No. 799,823. PATENTED SEPT. 19, 1905.
W. B. ALLBRIGHT.
COOLING APPARATUS.
APPLICATION FILED APR. 1, 1903.
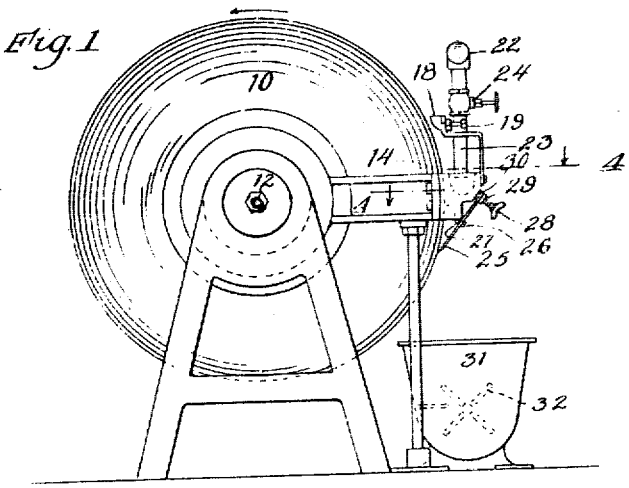
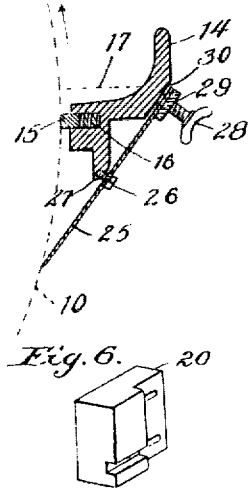
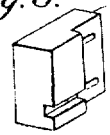
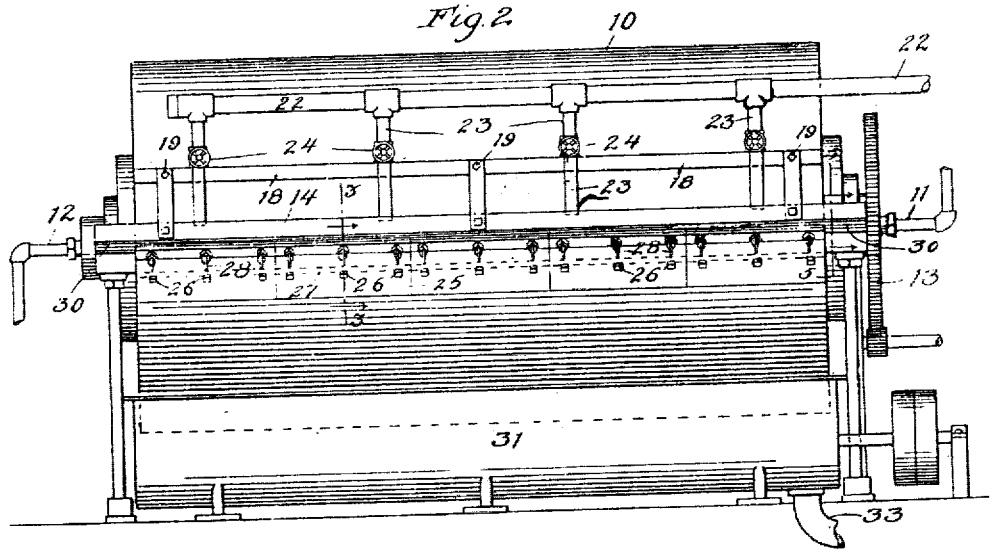
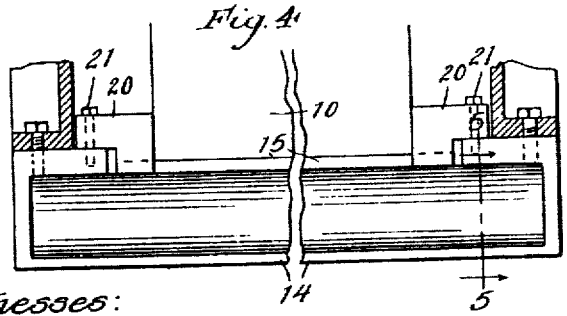
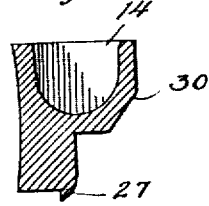
Witnesses:
Wm Geiger
A. W. Munday
Inventor:
William B. Allbright
By Munday, Evarts & Adcock.
Attorneys

UNITED STATES PATENT OFFICE.

WILLIAM B. ALLBRIGHT, OF CHICAGO, ILLINOIS.

COOLING APPARATUS.

No. 799,823. Specification of Letters Patent. Patented Sept. 19, 1905.

Application filed April 1, 1903. Serial No. 150,551.

*To all whom it may concern:*

Be it known that I, WILLIAM B. ALLBRIGHT, a citizen of the United States, residing in Chicago, in the county of Cook and State of Illinois, have invented a new and useful Improvement in Cooling Apparatus, of which the following is a specification.

This invention relates to an apparatus primarily designed for cooling melted lard in lard-factories. The lard as it comes from the process tanks or kettles in such factories must be cooled before it is put into the shipping-packages, and especially in the case of "compound" lards, as they are termed, composed of animal and vegetable fats or oils, it is much better that the cooling should be done as rapidly as possible in order to avoid crystallization as much as possible. The apparatus heretofore generally employed for this purpose consisted in a revolving smooth-surfaced hollow cylinder made of metal and into the interior of which a current of cold brine or other refrigerating liquid or medium is made to circulate. The lower segment of the cylinder is immersed for a considerable arc in a pan containing the melted lard, a thin sheet of which adheres to the cold surface of the revolving cylinder and is scraped off therefrom by a stationary blade located at the falling side.

In the present invention I dispense with the pan at the bottom of the cylinder and convey the lard to the surface of the cylinder by means of a trough located at about the level of the axis of the cylinder on the rising side and place the scraping-blade immediately below said trough, whereby I get a much longer continuance of the lard coating on the cylinder-surface—that is to say, a continuance through a greater portion of a complete revolution of the cylinder—and, moreover, remove the lard from the rising side below the scraping-blade instead of above it, so that the removed lard falls better into the receptacle.

Although my improved apparatus is especially designed for the cooling of lard, this apparatus without any change whatever in structure may be used for drying glutinous liquids—such, for example, as what is known in lard-factories and packing-houses as "stick"—by simply heating the brine which passes through the interior of the cylinder or by using any other fluid or gaseous heating medium. So, too, the apparatus is well adapted for chilling other material than melted lard—as, for example, for chilling rapidly paraffin—in this instance for inducing crystallization.

The invention consists in the various devices and combinations of devices which are novel, shown in the drawings, or described in the specification, as more specially pointed out in the claims.

In the accompanying drawings, which form a part of this specification, Figure 1 is an end elevation of the improved apparatus. Fig. 2 is a side elevation of the same. Fig. 3 is a cross-section of the feed-trough and scraper-blade. Fig. 4, upon a somewhat larger scale the same as Fig. 3, is a plan view of the feed-trough broken in the middle to accommodate it to the sheet. Fig. 5 is a vertical section of the feed-trough on the line 5 5 of Fig. 4. Fig. 6 is a perspective view of one of the end packing-blocks.

In the said drawings, 10 is the hollow cylinder having an axial inlet 11 and an axial outlet 12 for the circulation of the chilled brine or other temperature medium in its interior.

13 is the usual gear-wheel for revolving the cylinder, the same being connected with any suitable power mechanism.

14 is the feed-trough, having closed ends and open top and an open side and provided with a contact-packing 15, consisting of a wooden strip contained in a cavity and backed by springs 16. This packing-strip comes into contact with the smooth surface of the cylinder and forms a liquid-tight joint between the trough and the cylinder that substantially prevents any leakage of the contents of the trough downward. The melted lard is shown in the trough by the dotted line 17. This feed-trough, it will be seen, is located at about the height of the axis of the cylinder, and only a very narrow arc of the cylinder is in contact with the contents of the trough. This will be understood by reference to Fig. 3 of the drawings. The cylinder moves in the direction of the arrow, and its chilled surface passing in contact with the narrow horizontal band of lard has no opportunity to be heated thereby, but picks up an even and regular coating. To insure that too thick a coating shall not be picked up by the rapid chill induced by this apparatus, I provide above the trough a round-surfaced bar extending across the face of the cylinder and which smooths and flattens down the adhering sheet of lard and determines its thickness. This bar, which I call a "doctor," is marked 18 and may be adjusted to and from the cylinder-surface by adjusting-screws 19.

To prevent leakage of the trough at the ends of the cylinder, the wooden packing-blocks 20 are provided one at each end of the trough to bear against the end faces of the cylinder. These end blocks are secured to the trough by bolts 21, passing through slotted openings in the block, so that said blocks may be adjusted to fit tightly against the cylinder ends. The wooden bar 15 enters a rabbet in the blocks 20 at each end to insure against leakage. The surface of the block 20 in contact with the end of the cylinder may be faced with cloth or other packing substance and the space left between the block and the trough end by adjustment of the block toward the cylinder end packed with cotton-waste to make all tight.

The melted lard or other material to be treated is led by the pipe 22 to a position above the trough 14. A series of delivery-pipes 23 are distributed along the length of the trough and each provided with a valve 24, which may be opened or closed or partly opened, as desired, and afford a means for delivering the material to be treated in regulated quantity to the trough, from whence said liquid material is picked up by the cylinder as fast as it is fed in, so that there will be no occasion for an overflow-outlet from the trough; but, if desired, such an overflow-outlet may be provided and will be useful in cases where the condition of the material to be treated is subject to change from time to time, so that it will flow freer at times than at other times, in which case the overflow-outlet will avoid the necessity of close watching by the operator.

The operation of the apparatus is as follows: Suppose melted lard is to be chilled. Brine usually at a temperature of about zero of Fahrenheit's thermometer is caused to circulate into and out of the interior of the cylinder. The cylinder is made to rotate at a rate of, say, six or eight revolutions per minute. The wooden packing-bar and end blocks are adjusted into contact with the ends and side of the cylinder. The valves 24 in the pipes 22 are then opened, and the melted lard flows down into the feed-trough and is distributed along its entire length, where it comes in contact with the moving surface of the cylinder and is picked up by said surface in a sheet. The valves 24 are so adjusted that the melted lard does not flow into the feed-trough any faster than the surface of the cylinder removes it therefrom. The doctor above the trough smooths and flattens the sheet of adhering lard and removes any excess, which falls back into the feed-trough, and determines that the sheet of adhering lard shall be of equal thickness throughout—that is to say, prevents an excessive thickness at any part. The movement of the cylinder carries the adhering sheet or coating of lard around in its revolution, gradually cooling and chilling the same to the temperature of the contents of the cylinder or to such approach thereto as produces a satisfactorily-cooled product. When the lard has been thus carried around for almost the complete circumference of the cylinder, the cooled lard encounters the scraping-blade or scraper 25, not heretofore described. This scraper is preferably made in sections, five sections being shown in Fig. 2, and extends across the entire width of the cylinder. The blade is secured to the trough 14 by a bolt 26, which passes through a slot or hole in the blade. The surface of the head of this bolt next to the blade is made round, and the portion of the trough 14, as at 27, is also made round in an opposite curve, so that the blade can be tipped on the bolt 26. A set-screw 28, tapped into the upper end of the blade at 29, setting against the adjacent surface 30 of the trough, serves as a means for tightening or slackening the contact of the blade with the surface of the cylinder. In each of the five sections of the blade, as illustrated in Fig. 2, there are shown for each section three of the bolts 26 and three of the set-screws 28. This multiplication enables the blade to be more perfectly adjusted to its work. When the cooled lard comes around into contact with this blade, it is scraped off from the surface of the cylinder as cleanly as may be desired and falls into the receptacle 31, which may contain the usual mixing picker-shaft 32, which operates to mix the cooled lard and force it gradually to the outlet 33, where it is delivered into the package, or to any other point desired. In practice in the case of lard it is customary to apply a pump to the outlet-pipe 33, which forces the lard into the package.

In treating stick or other glutinous liquid for the purpose of drying the same no change is made in the apparatus except such as may be desired in the receptacle 31, which may be omitted, and except that the medium admitted to the interior of the cylinder for changing the temperature of its surface shall be a hot one instead of a cold one—as, for example, hot steam instead of cold brine.

I claim—

1. In an apparatus for treating fluids the combination of the revoluble temperature-changing cylinder, a feeding-trough with an open side next to the cylinder and located at the rising side of the cylinder, a wooden packing-strip 15 independent of the trough and movably fitting the same, the said trough having the projecting portions 27 and 30, a scraper mounted below the trough for removing the solidified material, pivoting means for the scraper whereby it is held tiltably on the said projecting portion 27 of the trough, and adjusting-screws 28 engaging the upper part of the scraper and bearing on the said portion 30 of the trough, substantially as set forth.

2. The combination of the revoluble temperature-changing cylinder, a feeding-trough with an open side adjacent to the cylinder and located at the side of the cylinder, a rigid or stiff packing-strip fitting and sliding on a portion of the trough below said open side, springs interposed between the trough and strip for causing the strip to press on the cylinder, blocks 20 occupying spaces at the ends of the open side of the trough, both the trough and the said blocks being formed with recesses in which the said packing-strip is fitted, means for securing said blocks when adjusted toward and against the ends of the cylinder, and a scraper at the side of the cylinder below the trough for removing material from the surface of the cylinder, as and for the purposes set forth.

3. In an apparatus for treating fluids the combination of the revoluble temperature-changing cylinder, a trough located at the side of the cylinder and formed with closed ends, an open side and a bottom flange having a cavity extending from end to end of the cylinder, a packing-strip movably seated in said cavity, means for pressing the packing-strip against the surface of the cylinder, packing-blocks arranged movably at the ends of the open side of the trough and at the ends of the cylinder, and means for securing the packing-blocks when adjusted toward and against the ends of the cylinder, substantially as set forth.

WILLIAM B. ALLBRIGHT.

Witnesses:
H. M. MUNDAY,
WILLA MINNICH.